United States Patent
Gardner

[11] 3,890,914
[45] June 24, 1975

[54] TORPEDO CONTROL SYSTEM

[75] Inventor: Paul C. Gardner, Scotia, N.Y.

[73] Assignee: The United States of America as represented by the Secretary of the Navy, Washington, D.C.

[22] Filed: Oct. 4, 1950

[21] Appl. No.: 188,465

[52] U.S. Cl. ............................. 114/23; 340/3 R
[51] Int. Cl.² .................. F42B 19/01; G01S 9/66
[58] Field of Search ...... 244/14, 77 B, 77 C; 340/3, 340/6, 3 R, 6 R; 318/5 T; 114/21, 23, 25

[56] References Cited
UNITED STATES PATENTS

| | | | |
|---|---|---|---|
| 1,892,431 | 12/1932 | Hammond, Jr. | 114/21 X |
| 2,349,370 | 5/1944 | Orner | 114/23 X |
| 2,424,193 | 7/1947 | Rost et al. | 244/3.19 X |
| 2,448,007 | 8/1948 | Ayres | 244/3.11 |
| 2,590,574 | 3/1952 | Robinson | 114/24 X |

*Primary Examiner*—Richard A. Farley
*Attorney, Agent, or Firm*—Ervin F. Johnston

EXEMPLARY CLAIM

1. In an automatic steering system for directing a moving body equipped with motorized steering gear toward a source of wave energy, means energized by said wave energy for generating separate dc voltages of relative magnitudes varying with the directional relationship of said source to said body, an amplitude comparator bridge including four resistor arms in endless series differentially energized by said voltages applied across first and second adjacent arms of said series and adapted to provide across third arm of said series a control voltage of a polarity depending on the relative magnitudes of said separate voltages, and means controlling the steering gear motor in accordance with the polarity of said control voltage.

11 Claims, 3 Drawing Figures

INVENTOR
PAUL C. GARDINER

INVENTOR
PAUL C. GARDINER

ATTORNEYS

TORPEDO CONTROL SYSTEM

The invention relates to improvements in control systems and more specifically to an improved electrical phase and amplitude comparison system suitable for use in finding the direction of a source of acoustic energy and guiding a self-propelled underwater torpedo in that direction. The acoustically directed torpedo is intended for use against submerged submarines and operates on the echo ranging principle rather than from sound generated by the submarine.

An important object of the invention is to provide an improved echo-controlled steering system.

Another object is the provision of an improved binaural differential-phase steering control system.

A further object is to provide an improved bridge circuit adapted to compare the relative magnitudes of two signal voltages.

Another important object is the provision of an improved bridge circuit adapted to signal the presence of wave energy.

Other objects and advantages of the invention will become apparent during the course of the following detailed description, taken in connection with the accompanying drawing, forming a part of this specification.

Figure 1:
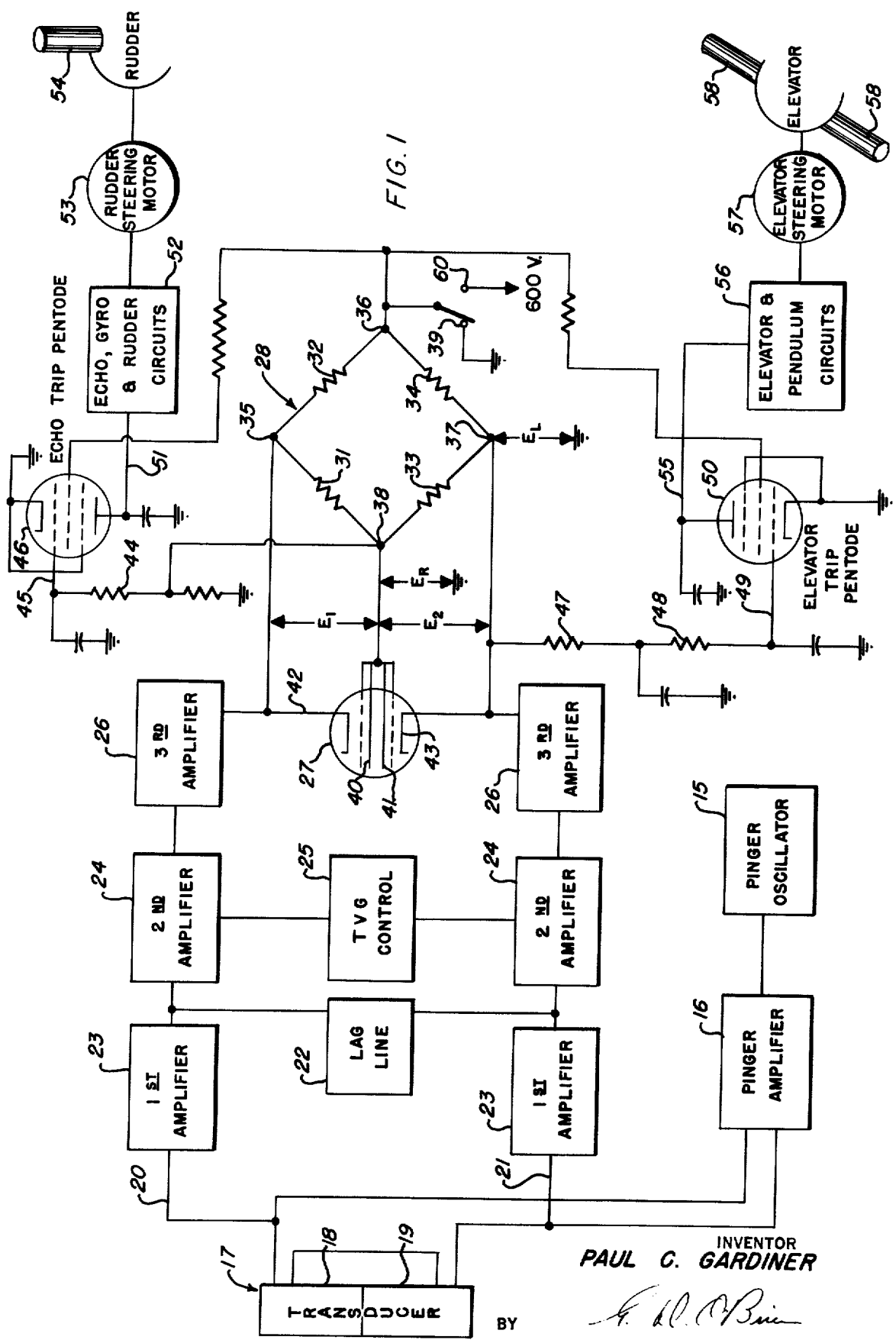
FIG. 1 is a diagrammatic view of the improved electrical phase and amplitude comparison system applied to an echo ranging torpedo steering system.

Pulses or pings of 60-kc voltage and 30-milliseconds duration are generated and amplified by a pinger oscillator 15 and amplifier 16 and sent out every 0.8 second through a transducer 17 whose vertically spaced sections 18, 19 are connected in parallel during this transmission by a pinger relay (not shown). The supersonic waves leave the transducer and, if there is a target present within range, are reflected back as echoes. Upon reaching the transducer, these echoes are translated into electrical input signal voltages in dual amplifier channels 20, 21, the two parts of the transducer acting independently during reception.

If an echo returns from a target below the axis of the torpedo, the wave front will strike the lower half of the transducer first and the signal voltage generated in the lower half will lead in phase that generated in the upper half. Likewise, if the echoes are from a target above the axis of the torpedo, the signal voltage in the upper half will lead that in the lower half. This phase difference is converted into an amplitude difference by the lag line 22 following the first stage 23 of dual amplification. This lag line 22 may be of the type shown and described in the copending application of Paul C. Gardiner, Ser. No. 166,286, filed June 5, 1950 now U.S. Pat. No. 3,024,754 entitled Phase Difference Control for Electroacoustic Steering Systems. Connected across the dual channels 17$a$, 18$a$ at the outputs of the first amplifiers 23, 23, the lag line 22, as shown in detail in FIG. 2, includes a pair of serially connected variable inductances 52$a$, 53$a$, through which plate current for the first amplification stage is fed from the source 40$a$. The outputs of the first amplifiers 23, 23 are coupled to ground through condensers 54$a$, 55$a$. The lag line converts phase difference between the high frequency outputs of the dual preamplifiers 23, 23 to an amplitude difference between resultant dual waves of unchanged frequency so that the amplitudes may be compared and the pitch of the torpedo changed to correspond.

Figure 3:
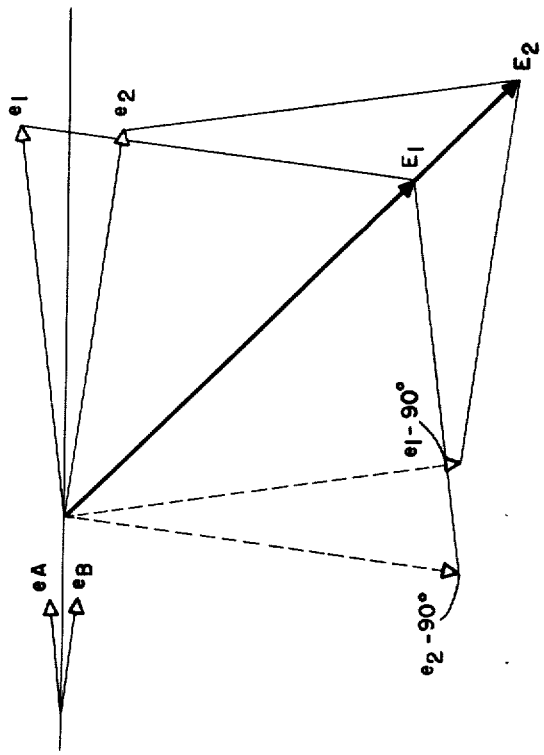
FIG. 3 is a vector diagram illustrating the operation of the lag line.
Figure 2:
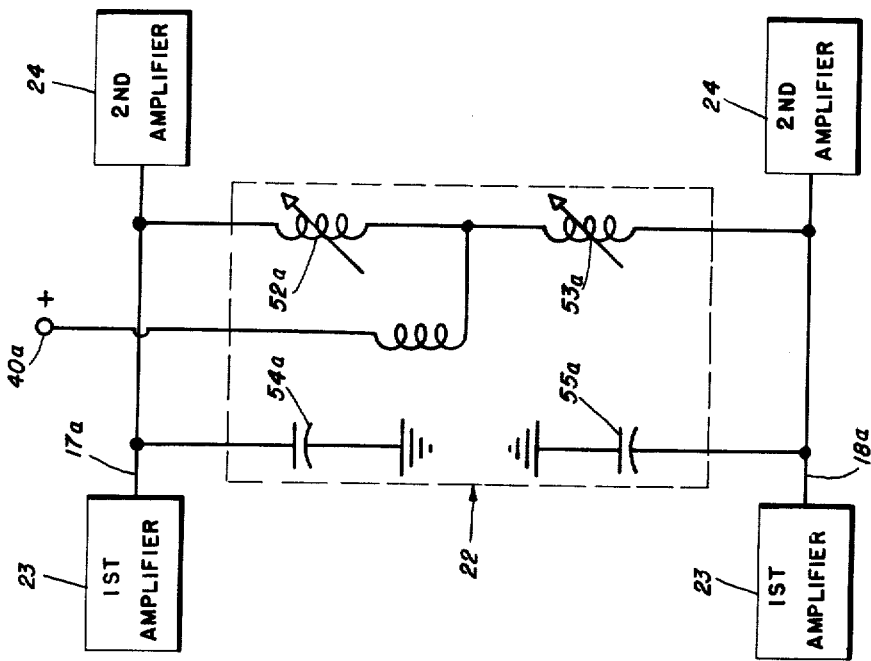
FIG. 2 is a diagrammatic view showing details of the lag line component of FIG. 1.

From an inspection of FIG. 2, it will be noted that the output of each preamplifier 23, 23 feeds across the lag line coils 52$a$, 53$a$ to the output of the other preamplifier. The cross feed voltage is not lowered much in amplitude but is lagged in phase an amount which depends on the values of the inductances 52$a$, 53$a$ and the capacitors 54$a$, 55$a$. This is a 90° lag line and the vector diagram of FIG. 3 illustrates its action in a case where the input voltages $e_A$ and $e_B$ are out of phase but of equal magnitude. Assuming that the dual channel amplifier gains are equal, the voltages $e_1$ and $e_2$ introduced by the preamplifiers 23, 23 will be out of phase and of equal magnitude. The vectors in this case show that the resultants $E_1$ and $E_2$ are unequal. Thus the original phase difference in the input voltages is translated into an amplitude difference in the output even though the amplifier gains are equal.

At the second amplifier stage 24, the overall sensitivity of the receiver is gradually increased during each reception interval by a time-variation-of-gain (TVG) control 25. This TVG control prevents false tripping on reverberation immediately following the ping and also prevents amplifier overloading on strong echo signals at close range.

The processed signals from both channels, after a third amplifier stage 26, are rectified by a twin diode 27 and applied to a comparator bridge 28 which acts as interpreter and disseminator of information necessary for correct rudder and elevator operation. This comparator bridge comprises four resistor arms 31–34 joined at corners 35–38. During reception the right corner 36 is grounded through a pinger relay contact 39. The plates 40, 41 of the twin diode 27 are each connected to the left corner 38 of the bridge, and the cathodes 42, 43 are connected one to the upper corner 35 and the other to the lower corner 37. Potential from the left corner 38 is impressed through a resistor 44 on the control grid 45 of an echo trip pentode 46. Potential from the lower corner 37 is impressed through resistors 47, 48 on the control grid 49 of an elevator trip pentode 50. The resistors 32, 34 at the right side of the bridge have a resistance twice that of the resistors 31, 33 at the left side.

Normally, when no echoes are present, both the echo tube 46 and the elevator tube 50 conduct plate current. The echo tube plate circuit 51 forms part of the echo, gyro and rudder circuits 52 which control a reversible rudder steering motor 53 adapted to displace the torpedo rudder 54 to the right or left. The elevator tube plate circuit 55 forms part of the elevator and pendulum circuits 56 which control a reversible elevator steering motor 57 adapted to elevate or depress the torpedo elevators 58.

When the rectified channel voltages $E_1$ and $E_2$ are equal, the voltage $E_R$ derived from the left bridge corner 38 for echo tube control is negative and equal to either channel voltage; and the voltage $E_L$ derived from the lower bridge corner 37 for elevator tube control is equal to one half the difference between voltages $E_1$ and $E_2$, which is zero.

When the rectified channel voltages $E_1$ and $E_2$ are unequal, the voltage $E_R$ at the left bridge corner 38 is equal to minus one half the sum of the voltages $E_1$ and $E_2$, which is always negative; and the voltage $E_L$ derived from the lower bridge corner 37 is equal to one half the difference between voltages $E_2$ and $E_1$. Voltage $E_L$ is therefore positive if voltage $E_2$ is greater than voltage $E_1$ and negative if voltage $E_1$ is greater than voltage $E_2$.

Three stages are involved in the operation of the torpedo, namely, initial dive, search and pursuit. The purpose of the initial dive is to get the torpedo down to its operating depth as rapidly as possible. The search stage enables the torpedo to make a 360° sweep of the surrounding region to locate the target. The pursuit stage is that wherein the device is homing on the target. As soon as the torpedo starts its dive, it goes into a port circle having a radius of about 140 feet, under the control of a gyroscope (not shown) associated with the echo, gyro and rudder circuits 52.

When the first echo of sufficient duration and magnitude is received during search, while the torpedo is normally turning in a port circle, the left corner 38 of the bridge becomes negative regardless of the direction from which the echoes arrive, as previously explained. The normally conducting echo tube 46 is biased to cut off by the negative voltage from the bridge corner 38, thereby deenergizing the echo tube plate circuit 51. Thereupon the echo, gyro and rudder circuits 52 are adapted to so energize the rudder steering motor 53 that the course of the torpedo will be changed from port to starboard. This will eventually result in the loss of the signal since the torpedo will turn away from the target. Upon the loss of echo signals, and after a prescribed time, the horizontal steering control circuits 52 are adapted to reverse the rudder steering motor 53. Thereupon the torpedo will resume its port circular turn until echoes are again received, when it will change its course once more to starboard. This operation, continuing until actual contact is made with the target, is called off-on steering.

Depth steering for all stages of operation of the torpedo is eventually controlled by a pendulum (not shown) associated with the elevator and pendulum circuits 56. While searching for a target, the torpedo is directed along a downward helical path at a substantially constant slightly negative pitch angle controlled by the elevator and pendulum circuits. As for depth steering during pursuit, the comparator bridge resolves the amplitude difference between the rectified outputs of the two channels 20, 21 into either positive or negative signal voltage depending on whether the echo source is above or below the transducer. This signal voltage is impressed on the control grid 49 of the elevator tube 50 which, in conjunction with the elevator and pendulum circuits 56, controls depth steering.

The comparator bridge is made inoperative during ping transmission by the application of 600 volts thereto through the pinger relay contact 60.

Various changes may be made in the form if invention herein shown and described without departing from the spirit of the invention or the scope of the following claims.

What is claimed is:

1. In an automatic steering system for directing a moving body equipped with motorized steering gear toward a source of wave energy, means energized by said wave energy for generating separate dc voltages of relative magnitudes varying with the directional relationship of said source to said body, an amplitude comparator bridge including four resistor arms in endless series differentially energized by said voltages applied across first and second adjacent arms of said series and adapted to provide across a third arm of said series a control voltage of a polarity depending on the relative magnitudes of said separate voltages, and means controlling the steering gear motor in accordance with the polarity of said control voltage.

2. In an automatic steering system for directing a moving body equipped with motorized steering gear toward a source of wave energy, means energized by said wave energy for generating separate dc voltages of relative magnitudes varying with the directional relationship of said source to said body, a resistance bridge including four resistor arms in endless series adapted upon differential energization applied across first and second adjacent arms of said series by said voltages to provide across a third arm of said series a control signal of a predetermined polarity, and means controlling the operation of said steering gear motor in one directional sense responsive to said control signal.

3. In an automatic steering system for directing a moving body equipped with reversibly-motorized steering gear toward a source of wave energy, means generating separate dc voltages of relative magnitudes varying with the directional relationship of said source to said body, a gaseous discharge device including an anode, a cathode and a control electrode, an amplitude comparator bridge including four resistor arms in endless series differentially energized across first and second adjacent arms of said series by said voltages, means connected across a third arm of said series adapted to impress on said electrode a control voltage governed by the relative magnitudes of said separate voltages whereby the conductivity of said device is controlled, and means controlling the steering gear motor in accordance with the conductivity of said device.

4. In an automatic steering system for directing a moving body equipped with reversibly-motorized steering gear toward a source of wave energy, means generating separate dc voltages of relative magnitudes varying with the directional relationship of said source to said body, a gaseous discharge device including an anode, a cathode and a control electrode, an amplitude comparator bridge including four resistor arms in endless series differentially energized across first and second adjacent arms of said series by said voltages, means connected across a third arm of said series adapted to impress a control voltage on said electrode of a variable polarity governed by the relative magnitudes of said separate voltages, said device being adapted to conduct upon the application of positive voltage to its control electrode and to cut off conduction upon the application of negative voltage, and means controlling the direction of operation of said steering gear motor governed by the conductivity or non-conductivity of said device.

5. In an automatic steering system for directing a moving body equipped with motorized steering gear toward a source of wave energy, means energized by said wave energy adapted to generate separate ac voltages having a phase relationship governed by the direction of said source relative to said body, an amplitude comparator bridge including four resistor arms in endless series, means adapted to differentially energize said bridge across first and second adjacent arms of said series with dc voltages of relative magnitudes governed by the phase relationship of said ac voltages, said bridge being adapted to furnish across a third arm of said series a signal voltage resulting from comparison of said dc voltages, and means responsive to said signal voltage for controlling said steering gear motor.

6. In an automatic steering system for directing a moving body equipped with motorized steering gear toward a wave reflective surface, a transmitter carried by said body adapted to direct wave energy toward said surface, means energized by said wave energy upon reflection from said surface adapted to generate separate ac voltages having a phase relationship governed by the direction of said surface relative to said body, an amplitude comparator bridge including four resistor arms in endless series, means adapted to differentially energize said bridge across first and second adjacent arms of said series with dc voltages of relative magnitudes governed by the phase relationships of said ac voltages, said bridge being adapted to furnish across a third arm of said series a signal voltage resulting from comparison of said dc voltages, and means responsive to said signal voltage for controlling said steering gear motor.

7. In an automatic steering system for directing a moving body equipped with motorized steering gear toward a wave reflective surface, a transmitter carried by said body adapted to direct wave energy toward said surface, means energized by said wave energy upon reflection from said surface adapted to generate separate dc voltages of relative magnitudes varying with the directional relationship of said source to said body, an amplitude comparator bridge including four resistor arms in endless series differentially energized across first and second adjacent arms of said series by said voltages and adapted to provide across a third arm of said series a control voltage varying with changes in the relative magnitudes of said separate voltages, and means controlling the steering gear motor in accordance with changes in said control voltage.

8. In an automatic steering system for directing a moving body equipped with motorized steering gear toward a wave reflective surface, a transmitter carried by said body adapted to direct wave energy toward said surface, means energized by said wave energy upon reflection from said surface adapted to generate separate ac voltages of substantially equal amplitude but having a phase relationship governed by the direction of said surface relative to said body, voltage comparing means, means adapted to differentially energize said comparing means with dc voltages of relative magnitudes governed by the phase relationship of said ac voltages, said voltage comparing means upon differential energization being adapted to furnish a signal voltage resulting from comparison of said dc voltages, and means responsive to said signal voltage for controlling said steering gear motor.

9. In an automatic steering system for directing a moving body equipped with separately motorized azimuth and depth steering gear toward a source of wave energy, means energized by said wave energy for generating separate ac voltages of substantially equal amplitude but having a phase relationship governed by the direction of said source relative to said body, an amplitude comparator bridge including resistor arms, means including a phase-shifting circuit and rectifiers adapted to differentially energize said bridge at predetermined spaced points with dc voltages of a relative magnitude governed by the phase relationship of said ac voltages, said bridge upon differential energization being adapted to furnish at one point a first signal voltage of predetermined polarity and at another point a second signal voltage of variable polarity governed by the differential magnitude of said dc voltages, means adapted to energize one of said separate steering gear motors to operate its associated steering gear in one sense responsive to said first signal voltage, and means adapted to energize the other steering gear motor to operate its associated steering gear in either one of two opposite senses governed by the polarity of said second signal voltage.

10. In an automatic steering system for directing a moving body equipped with motorized steering gear toward a source of wave energy, means energized by said wave energy adapted to generate separate ac voltages of substantially equal amplitude but having a phase relationship governed by the direction of said source relative to said body, an amplitude comparator bridge including resistor arms, means including a phase-shifting line and dual rectifiers adapted to differentially energize said bridge at predetermined spaced points with dc voltages of relative magnitudes governed by the phase relationship of said ac voltages, said bridge being adapted to furnish at one point a signal voltage resulting from comparison of said dc voltages, and means responsive to said signal voltage for controlling said steering gear motor.

11. In an automatic steering system for directing a moving body equipped with reversibly-motorized steering gear toward a source of wave energy, means energized by said wave energy adapted to generate separate ac voltages of substantially equal amplitude but having a phase relationship governed by the direction of said source relative to said body, an amplitude comparator bridge including resistor arms, dual conducting channels including dual preamplifiers, a phase-shifting channel-interconnecting line and dual rectifiers adapted to differentially energize said bridge at predetermined spaced points with dc voltages of relative magnitudes governed by the phase relationship of said ac voltages, said bridge being adapted upon said differential energization to furnish at one point a comparison signal voltage of a polarity governed by the relative magnitudes of said dc voltages, and means responsive to said signal voltage for operating said steering gear motor in a direction governed by the polarity of said signal voltage.

* * * * *